United States Patent [19]
Baird

[11] Patent Number: 5,184,132
[45] Date of Patent: Feb. 2, 1993

[54] GARAGE DOOR OPENING DEVICE

[76] Inventor: William E. Baird, 697 S. Farben Dr., Diamond Bar, Calif. 91765

[21] Appl. No.: 788,493

[22] Filed: Nov. 6, 1991

[51] Int. Cl.$^5$ .............................................. H04Q 9/14
[52] U.S. Cl. .............................. 341/176; 340/825.69; 340/825.72; 455/99
[58] Field of Search ........................ 341/176; 455/99; 340/825.69, 825.72

[56] References Cited

U.S. PATENT DOCUMENTS 4,731,605  3/1988  Nixon ................................... 341/176
4,847,601  7/1989  Conti ................................... 341/176

Primary Examiner—Glen R. Swann, III

[57] ABSTRACT

Disclosed is a garage door opening device, including a garage door opener transmitter which provides a signal to a receiver that, upon receiving said signal, actuates a drive mechanism that opens the garage door. The transmitter is positioned in an automobile in a location normally hidden from view of a driver of the automobile. The transmitter includes a pair of terminals across which a manually operable switch element is connected. This switch element has means for connecting it across the terminals, with the actuator for the switch element mounted in the automobile in an exposed position in view of the driver and within easy reach of the driver. Preferably, the switch element is of the push button type.

2 Claims, 1 Drawing Sheet

GARAGE DOOR OPENING DEVICE

BACKGROUND OF THE INVENTION

1. Field of the Invention

This invention relates to a garage door opener, and, in particular, to one which employs a transmitter mounted in an automobile, hidden from view of the driver, and including a switch that is exposed to the view of the driver and within easy reach of the driver.

2. Background Discussion

Conventional garage door openers are well-known. They include a transmitter which is carried by the driver of an automobile, and a receiver within the garage that, upon receiving a radio signal from the transmitter, actuates a drive mechanism that opens and closes the garage door.

The transmitters of such conventional garage door openers are not mounted permanently within the automobile, but rather are placed in different locations in the automobile, frequently clipped to the sun visor. They are normally in view of the driver, or are placed inside the glove compartment, and removed when needed. These transmitters include a manually-actuated switch which, when actuated, transmits within the vicinity of the garage the signal to the receiver.

SUMMARY OF THE INVENTION

It is the objective of this invention to mount the transmitter in a location in the automobile that hides it from view. Such a hidden transmitter includes a switch which is connected across the terminals of the conventional transmitter, with the switch mounted in view and within easy reach of the driver.

The device of this invention has several features, no single one of which is solely responsible for its desirable attributes. Without limiting the scope of this invention as expressed by the claims which follow, its features will be discussed in the section entitled, "DETAILED DESCRIPTION OF THE PREFERRED EMBODIMENT." After considering this discussion, one will understand how the features of this invention provide its advantages, which include ease of installation and simplicity of use.

DESCRIPTION OF THE DRAWING

The preferred embodiment of this invention, illustrating all its features, will now be discussed in detail. This embodiment depicts the novel and non-obvious garage door opener of this invention shown in the accompanying drawing, which is for illustrative purposes only. This drawing includes the following figures (FIGS.), with like numerals indicating like parts.

DETAILED DESCRIPTION OF THE PREFERRED EMBODIMENT

Figure 1:
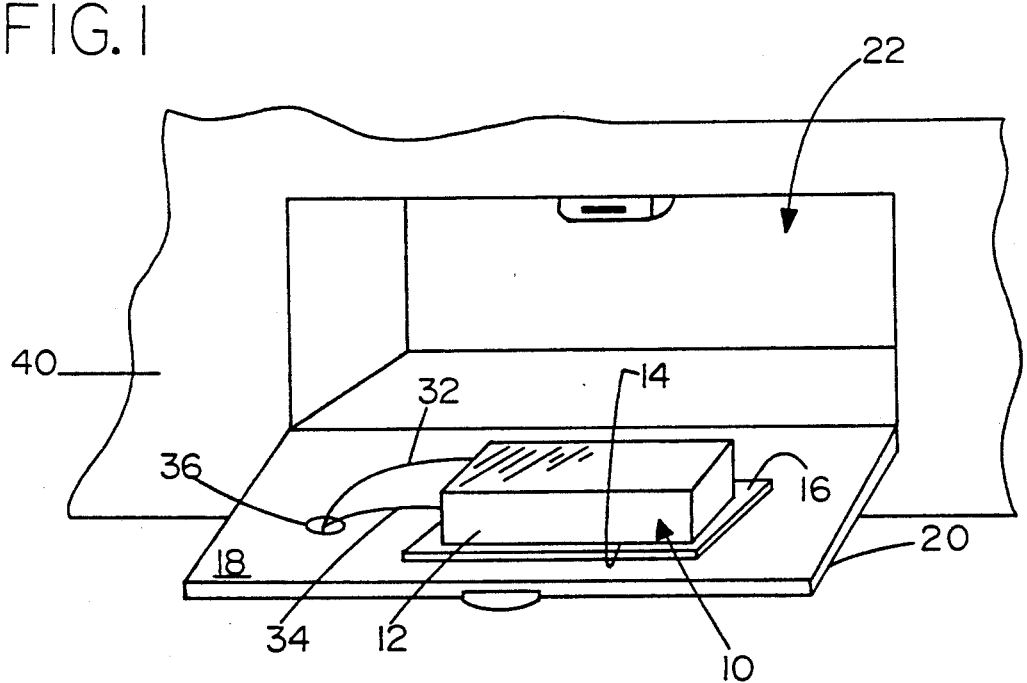
FIG. 1 is a perspective view showing an open glove compartment having a garage door opener transmitter mounted to the inside of the door of the glove compartment and modified to include a push-button switch.
Figure 2:
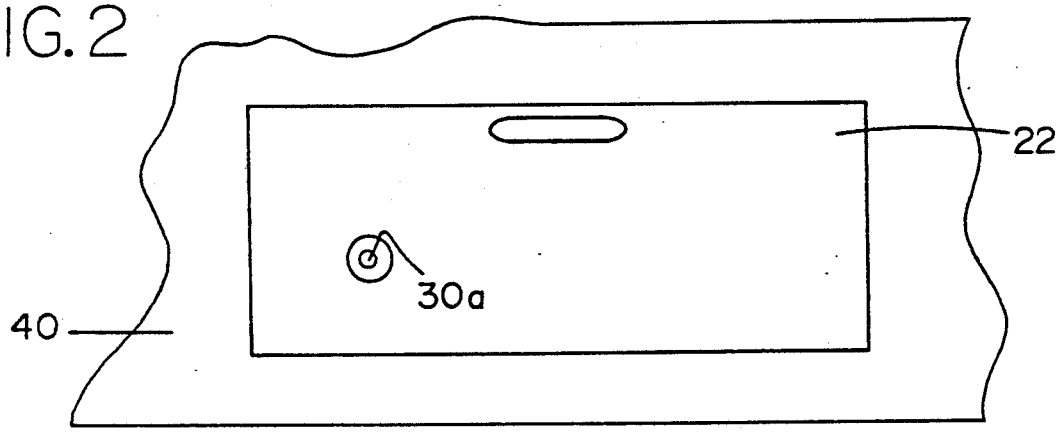
FIG. 2 is a front view of the glove compartment shown in FIG. 1, with the door of the glove compartment closed, exposing the push-button switch.
Figure 3:
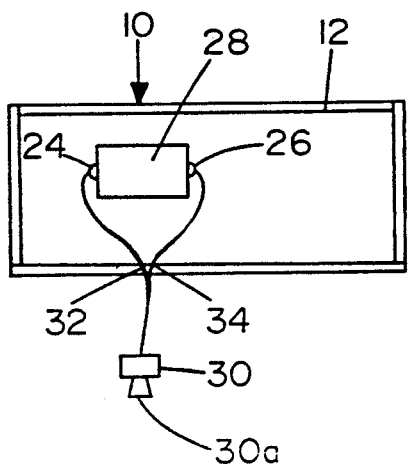
FIG. 3 is a garage door opener transmitter with its top cover removed showing how the push-button switch shown in FIG. 2 is connected to the terminals of the transmitter.

As illustrated in FIGS. 1 through 3, the garage door opening device 10 of this invention includes a conventional transmitter 12 with the capability of transmitting a radio signal to a garage door opener receiver (not shown). Preferably, the transmitter 12 is securely mounted, but in a removable fashion. For example, the transmitter 12 may include an underside surface 14 to which is attached the hook elements (not shown) of a hook-and-fabric fastener. The fabric element 16 of the hook-and-fabric fastener is glued to the inside surface 18 of the door 20 of a glove compartment 22 of an automobile. By simply pressing the transmitter 12 against the fabric element 16, the hooks grasps the fabric element and hold the transmitter 12 securely in place.

As best illustrated in FIG. 3, the transmitter 12 has a pair of terminals 24 and 26 of the electronic control 28 which are normally connected by a manually operable switch included in the transmitter. This manually operable switch has been bypassed, and a push-button type switch 30 is connected across these terminals 24 and 26 by wires 32 and 34. This push-button type switch 30 has a push-button actuator 30a that extends through an opening 36 in the door 20 of the glove compartment 22. The two wires 32 and 34 from the push-button type switch 30 are each respectively connected to the terminals. Thus, when the door 20 of the glove compartment 22 is closed as shown in FIG. 2, the push-button actuator 30a of the switch 30 is exposed to view of the driver and within easy reach of the driver. When the driver approaches the garage, he simply reaches over and pushes the push-button actuator 30a to cause the transmitter 12 to transmit a radio signal to the receiver.

Although the transmitter 12 is shown as mounted within the glove compartment 22, it could be mounted anywhere in the automobile where it would be hidden from view, for example, underneath the dash board 40. In this situation, a hole would be drilled through the dash board 40, rather than in the door 20 of the glove compartment 22, and the push-button actuator 30a mounted in the hole in the dash board 40.

Preferably, the garage door opening device 10 of this invention would be sold as a kit, including the liquid solder (not shown) or other adhesive which upon solidifying is conductive for securing the wires across the switch, the push-button switch 30 with the wire leads 32 and 34 extending from it and connected to complete a bypassed circuit when the switch 30 is actuated, installation instructions, and, preferably, a conventional hook-and-pile fastener. The instructions would state how to disassemble the cover of the conventional transmitter, bypassed the standard switch in this transmitter, and replace it with the push bottom switch 30, using the the liquid solder to secure the ends of the wires 32 and 34 to the terminals 24 and 26. Thus, a conventional transmitter can be easily converted into the garage door opening device 10 of this invention that can be mounted in a hidden position within the glove compartment, or other location in an automobile.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed. On the contrary, the intention is to cover all modifications and alternate constructions coming within the spirit and scope of the invention as generally expressed by the following claims, which particularly point out and distinctly claim the subject matter of the invention.

I claim:

1. In an automobile having a dash board, a garage door opening device, including:

a garage door opener transmitter which provides a signal to a receiver that, upon receiving said signal, actuates a drive mechanism that opens a garage door, said transmitter being mounted to the dash board in a location normally hidden from view of a driver of the automobile, said transmitter including a pair of terminals across which a manually operable switch element is connected, said switch element having means for connecting said switch element across said terminals, with said switch element extending through an opening in the dash board to expose said switch element to the view of the driver and within easy reach of the driver, said transmitter being enclosed within a glove compartment in the dash board, said glove compartment having a door which opens and closes and the switch element extends through an opening in the door.

2. A kit used to install a transmitter of a garage door opener in the glove compartment in the dash board of an automobile, said glove compartment having a door, including:

a push button actuator for a switch of said transmitter, a pair of wires extending from the actuator which are adapted to be secured across said switch to bypass said switch, and an adhesive for securing the wires across the switch, said transmitter being adapted to be enclosed within the glove compartment in the dash board with said switch element extending through an opening in the glove compartment door.

* * * * *